United States Patent [19]

Wigley, Jr.

[11] Patent Number: 4,583,263

[45] Date of Patent: Apr. 22, 1986

[54] SKEWERING DEVICE

[76] Inventor: Thomas W. Wigley, Jr., 21959 Siegal Dr., Novi, Mich. 48050

[21] Appl. No.: 656,960

[22] Filed: Oct. 2, 1984

[51] Int. Cl.⁴ .............................................. A22C 17/00
[52] U.S. Cl. ..................................................... 17/1 S
[58] Field of Search ................... 17/1 S, 1 R; 83/454, 83/466.1

[56] References Cited

U.S. PATENT DOCUMENTS

| 2,303,566 | 12/1942 | Majestic | 17/1 R |
| 3,405,422 | 10/1968 | Sico et al. | 17/1 S |
| 4,429,435 | 2/1984 | Walls | 17/1 S |

FOREIGN PATENT DOCUMENTS 0098451  1/1984  European Pat. Off. .............. 17/1 S

*Primary Examiner*—Willie G. Abercrombie
*Attorney, Agent, or Firm*—Krass and Young

[57] ABSTRACT

A skewering device comprising a frame structure defining a magazine adapted to receive a cartridge, a cartridge adapted to receive food to be skewered and thereafter loaded into the magazine, and a skewering assembly carried by the frame structure operative when actuated to pass a plurality of skewers in parallel fashion through the food in the cartridge with the cartridge loaded into the magazine. The frame structure comprises a pair of parallel rails, and the skewering assembly includes a plurality of parallel tubes positioned between the rails, a plurality of parallel push rods positioned with their one ends extending into one ends of the tubes, and a power cylinder positioned at the end of the frame structure opposite from the magazine with the free end of the piston rod of the cylinder secured to a cross member mounting the other ends of the push rods. The cartridge comprises a pair of plate members hingedly connected along one side edge thereof so that, with the plate members in an open position, food may be placed on one of the plate members whereafter the other plate member may be pivoted into position over the food to form a sandwich comprising the two plate members and the food positioned therebetween, whereafter the cartridge sandwich may be loaded into the magazine for skewering.

9 Claims, 4 Drawing Figures

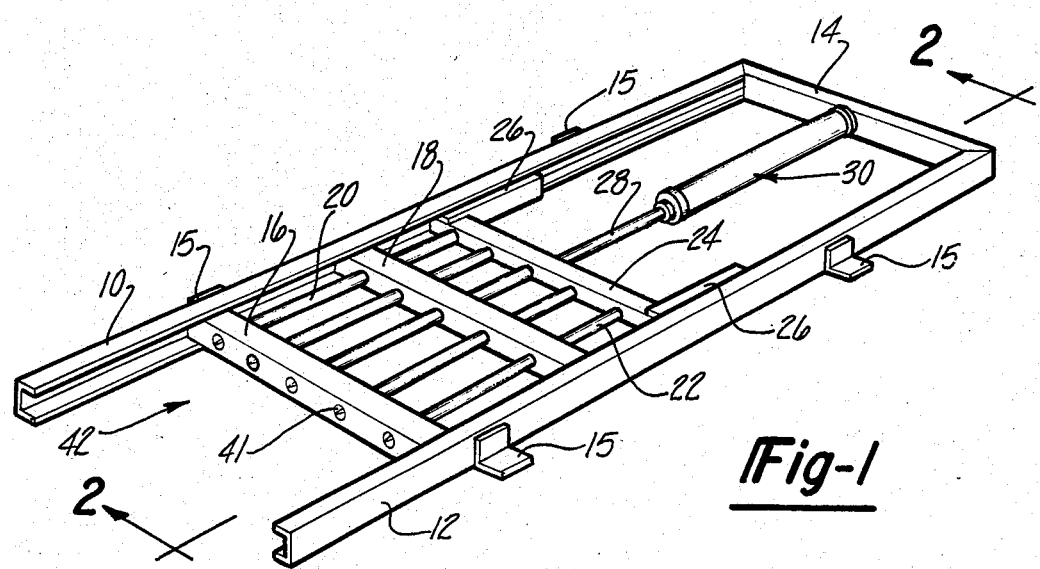
*Fig-1*
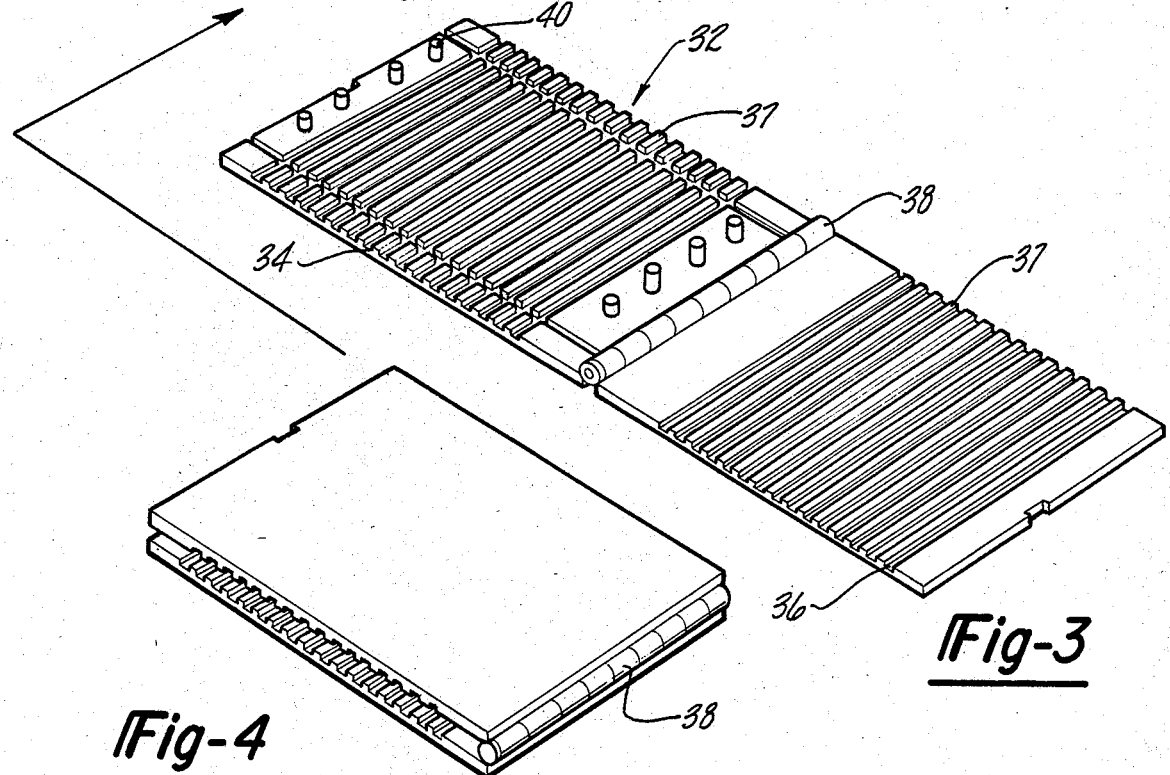
*Fig-3*
*Fig-4*
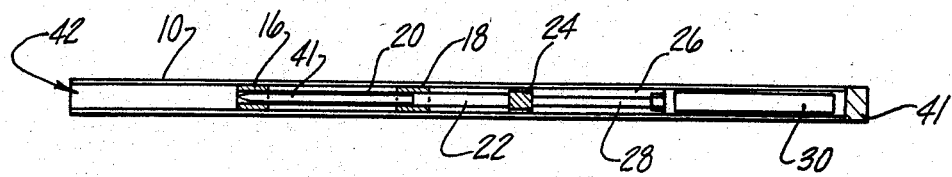
*Fig-2*

SKEWERING DEVICE

BACKGROUND OF THE INVENTION

This invention relates to food processing devices and, more particularly, to a device to facilitate skewering of meat or other food.

Many popular foods, for example shish kebob, and city chicken, are pierced with a skewer prior to or after cooking and are very often served on the skewer. Conventionally, the skewering operation is performed manually. The worker normally holds the food to be skewered in one hand and pierces it with a skewer. As will be appreciated, this is a time consuming, laborious and uneconomical method of positioning the food products on a skewer. Moreover, these manual preparations are, to some extent, unsanitary and do not lend themselves to mass production of skewered food products. Various automatic skewering machines have been proposed in the past. These various machines have not achieved widespread application, however, either because they have been overly complicated and overly expensive in construction or because they have not efficiently performed the required skewering operations.

SUMMARY OF THE INVENTION

The present invention is directed to a unique skewering device which is simple and inexpensive in construction and yet which performs the required skewering operations in an efficient manner.

The skewering device of the invention, broadly considered, comprises a frame structure defining a magazine adapted to receive a cartridge; a cartridge adapted to receive food to be skewered and thereafter loaded into the magazine; and means carried by the frame structure operative when actuated to pass a plurality of skewers, in parallel fashion, through the food in the cartridge with the cartridge loaded into the magazine whereafter the cartridge may be removed from the magazine and the skewered food removed from the cartridge for further processing.

According to a further feature of the invention, the frame structure is elongated, the magazine is defined at one end of the frame structure, and the frame structure is open at that one end to enable the cartridge to be loaded slidably into the magazine from that one end.

According to a further feature of the invention, the means for driving the skewers through the food positioned in the cartridge comprises a plurality of parallel passages opening at their one ends adjacent the inboard end of the magazine, a plurality of push rods arranged with their one ends extending into the other ends of the passages, and drive means operative to move the push rods into the passages to cause skewers positioned in the passages to be forced into the food positioned in the cartridge.

According to a further feature of the invention, the drive means comprises a power cylinder secured at its one end to the other end of the frame structure and having the free end of its piston rod secured to a cross member mounting the other ends of the push rods.

According to a further feature of the invention, the frame structure includes a pair of inwardly opening parallel channel members and the cartridge is sized to slide into the open end of the channel members.

According to yet another feature of the invention, the cartridge comprises a pair of plate members hingedly connected along one side edge thereof whereby, with the plate members in an open position, food may be placed on one of the plate members whereafter the other plate member may be pivoted into position over the food to form a sandwich comprising the two plate members and the food positioned therebetween, whereafter the cartridge may be slidably loaded into the magazine for skewering.

BRIEF DESCRIPTION OF THE DRAWINGS

FIG. 1 is a perspective view of the invention skewering device;

FIG. 2 is a cross-sectional view taken on line 2—2 of FIG. 1; and

FIGS. 3 and 4 are perspective views of a cartridge for use with the skewering device of FIG. 1.

DETAILED DESCRIPTION OF THE PREFERRED EMBODIMENT

The skewering device as seen schematically in FIG. 1 may be mounted in any of a plurality of attitudes including wall mounting in either a horizontal or vertical disposition, table mounting, or floor mounting.

The skewering device includes a frame structure comprising a pair of inwardly facing channel members 10 and 12 joined at one end by a cross member 14. Brackets 15 are secured to channel member 10,12 to facilitate mounting of the skewering device on a suitable support surface. Members 10, 12, 14 and 15 may, for example, be formed of stainless steel. A pair of cross members 16 and 18 extend transversely between channel members 10 and 12 at an intermediate location along the channel members. Cross members 16 and 18 may be formed, for example, of teflon. A plurality of stainless steel tubes 20 extend between cross members 16 and 18 with one ends of the tubes fixedly secured in suitable bores in cross member 16 and the other ends of the tubes fixedly secured in suitable bores in cross member 18. A plurality of stainless steel push rods 22 are positioned with their one ends extending into one ends of the tubes 20. The other ends of push rods 22 are suitably secured to a cross member 24 which in turn is fixedly mounted at its opposite end in teflon slide members 26 slidably mounted in channels 10 and 12. Member 24 is suitable secured to the free end of the piston rod 28 of a power cylinder 30 secured to cross member 14. Power cylinder 13 may be air or hydraulic and is suitably actuated by control means (not shown).

The invention skewering device further includes a cartridge 32 seen in FIGS. 3 and 4. Cartridge 32 includes a pair of plate members 34 and 36 hingedly connected along one side thereof by a hinge structure 38. Serrations 37 are provided on the upper face, as seen in FIG. 3, of each plate member. Plate members 34 may, for example, be made of teflon. A plurality of stainless steel pin stops 40 are provided on plate member 34 in two parallel rows.

In use, skewers 41 are loaded into the open end of tubes 20 and the food to be skewered is placed on plate member 34 between the two rows of pin stops 40, whereafter plate member 36 is pivoted into position, as seen in FIG. 4, over the food to form a sandwich comprising the two plate members and the food positioned therebetween. Stop pins 40 control and delimit the amount of pivotal movement of plate member 36 relative to plate member 34. After the cartridge has been loaded and closed by pivoting plate member 36 over plate member 34, the loaded cartridge sandwich is inserted into the open end of channel members 10 and 12 into a magazine 42 defined at one end of the frame structure between the channel members 10 and 12. The opposite edge portions of the cartridge sandwich slidably guide in the opposed grooves provided by channel members 10 and 12 until the cartridge abuts the cross member 16. Means (not shown) may be provided to maintain the cartridge in its loaded position or, alternatively, the cartridge may be maintained in its loaded position by the hand of the operator. Once the loaded cartridge has been positioned in the magazine, power cylinder 30 is actuated to extend piston rod 28 and drive push rods 22 into tubes 28 and thereby drive skewers 41 into the food positioned in cartridge 32, whereafter cartridge 32 may be slidably removed from the magazine 42 and the cartridge opened to remove the food to allow further processing of the food. For example, in the case of meat, a knife may be used to score between the skewers, along embossed ridge lines produced by serrations 37, so that the skewered meat sections are weakly joined together, whereafter the skewered meat sections can be barbecued en mass and then separated in the manner of barbecued ribs.

The invention skewering device will be seen to provide a simple and inexpensive apparatus for quickly and effectively skewering meat and other food products.

Whereas a preferred embodiment of the invention has been illustrated and described in detail, it will be apparent that various modifications may be made in the preferred embodiment without departing from the scope or spirit of the invention. For example, in the case of shish kebobs, the plate members of cartridge 32 may be formed with confronting semi-circular channels so that the various vegetable and meat pieces may be laid in the channels to form generally cylindrical kebob assemblies which would thereafter be individually skewered by skewers 41 in the manner previously described.

I claim:
1. A skewering device comprising:
A. a frame structure defining a magazine adapted to receive a cartridge;
B. a cartridge for loading into said magazine having a size and shape conforming to said magazine and having means for receiving and holding food to be skewered therein;
C. means on said frame structure for guiding said cartridge into loaded position in said magazine;
D. means carried by said frame structure operative when actuated to pass a plurality of skewers, in parallel fashion, through the food held in said cartridge with the cartridge loaded into said magazine, whereafter said cartridge may be removed from said magazine and the skewered food removed from said cartridge for further processing.
2. A skewering device according to claim 1 wherein:
E. said frame structure is elongated;
F. said magazine is defined at one end of said frame structure; and
G. said guiding means includes means defining an opening at said one end of said frame structure to enable said cartridge to be loaded into said magazine from said one frame structure end.
3. A skewering device according to claim 2 wherein:
H. said operative means comprises:
1. means defining a plurality of parallel passages opening at their one end adjacent the inboard end of said magazine,
2. a plurality of push rods arranged with their one ends extending into the other ends of said passages, and
3. drive means operative to move said push rods into said passages to cause skewers positioned in said passages to be forced into food positioned in said cartridge.
4. A skewering device according to claim 3 wherein:
I. said drive means comprises a power cylinder secured at its one end to the other end of said frame structure and having the free end of its piston rod secured to a cross member mounting the other ends of said push rods.
5. A skewering device according to claim 1 wherein:
E. said cartridge comprises a pair of plate members hingedly connected along one side edge thereof, whereby with the plate members in an open position, food may be placed on one of said plate members whereafter the other plate member may be pivoted into position over said food to form a sandwich comprising the two plate members and the food positioned therebetween, whereafter the cartridge sandwich may be loaded into said magazine for skewering.
6. A skewering device comprising:
A. an elongated frame structure including a pair of inwardly opening channel members;
B. a plurality of laterally spaced parallel tubes positioned between and in parallel relation to said channel members at an intermediate location therealong;
C. a plurality of laterally spaced parallel push rods positioned with their one ends extending into one ends of said tubes;
D. a power cylinder positioned between said channel members at one end of said frame structure with its cylinder secured to a cross member extending between one ends of said channel members and the free end of its piston rod secured to a slideable cross member mounting the other ends of said push rods and guided for sliding movement at its opposite ends in said channel members;
E. a fixed cross member extending between said channel members at a location spaced from the other ends of said channel members and mounting the other ends of said tubes;
and
F. a magazine defined at the other end of said frame structure between said channel members and said fixed cross member whereby, with food positioned in said magazine and skewers positioned in said tubes, said cylinder may be actuated to drive said push rods into said tubes and drive the skewers into the food positioned in said magazine.
7. A skewering device according to claim 6 wherein:
F. said skewering device further includes a cartridge adapted to be removably loaded into said magazine from said other end of said frame structure.
8. A skewering device according to claim 7 wherein:
G. said cartridge comprises a pair of plate members hingedly connected along one side edge thereof whereby, with the plate members in an open position, food may be placed on one of said plate members whereafter the other plate member may be pivoted into position over said food to form a sandwich comprising the two plate members and the food positioned therebetween, whereafter the car- tridge sandwich may be loaded into said magazine for skewering.

9. A skewering device comprising:
A. an elongated frame structure comprising a pair of inwardly opening parallel channel members open at one end thereof to define a magazine therebetween at one end of said frame structure;
B. a cartridge adapted to receive food to be skewered and sized to slide into the open end of said channel members for loading into said magazine; and
C. means carried by said frame structure operative when actuated to pass a plurality of skewers, in parallel fashion, through the food in said magazine with the cartridge loaded into said magazine, whereafter said cartridge may be removed from said magazine and the skewered food removed from said cartridge for further processing;
D. said operative means comprising:
   1. means defining a plurality of parallel passages opening at their one end adjacent the inboard end of said magazine,
   2. a plurality of push rods arranged with their one ends extending into the other ends of said passages, and
   3. drive means operative to move said push rods into said passages to cause skewers positioned in said passages to be forced into food positioned in said cartridge;
E. said drive means comprising a power cylinder secured at its one end to the other end of said frame structure and having the free end of its piston rod secured to a cross member mounting the other ends of said push rods.

* * * * *